United States Patent [19]

Lancaster et al.

[11] Patent Number: 4,762,731

[45] Date of Patent: Aug. 9, 1988

[54] BARRIER FILM STRUCTURES USING CARBON MONOXIDE-CONTAINING POLYMERS

[75] Inventors: Gerald M. Lancaster, Surfside; David C. Kelley, Angleton; Russell H. Cramm, Lake Jackson, all of Tex.; Charles V. Neywick, Midland, Mich.

[73] Assignee: The Dow Chemical Company, Midland, Mich.

[21] Appl. No.: 943,300

[22] Filed: Dec. 17, 1986

Related U.S. Application Data

[60] Division of Ser. No. 738,009, May 28, 1985, Pat. No. 4,640,865, which is a continuation-in-part of Ser. No. 645,990, Aug. 31, 1984, Pat. No. 4,601,948, which is a continuation-in-part of Ser. No. 531,110, Sep. 12, 1983, Pat. No. 4,600,614.

[51] Int. Cl.$^4$ .......................... B05D 3/06; B05D 5/10; C09J 7/02
[52] U.S. Cl. ............................. 427/40; 427/208.2; 427/385.5; 427/39; 428/347; 428/349
[58] Field of Search ................ 427/39, 40, 208.2, 384, 427/385.5; 524/414; 428/421, 346, 347, 349

[56] References Cited

U.S. PATENT DOCUMENTS

| | | | |
|---|---|---|---|
| 4,139,522 | 2/1979 | Lantos | 524/414 |
| 4,421,780 | 12/1983 | Buzio et al. | 427/40 |
| 4,468,412 | 8/1984 | Fujii et al. | 427/40 |

FOREIGN PATENT DOCUMENTS

2063707  6/1981  United Kingdom ............... 427/40

Primary Examiner—Norman Morgenstern
Assistant Examiner—Margaret Burke
Attorney, Agent, or Firm—Walter J. Lee

[57] ABSTRACT

Articles useful as RF-sealable packaging materials comprise a halopolymer barrier layer coated onto, or adhered to, a carbon monoxide-containing polymer, wherein the carbon monoxide-containing polymer provides RF-sealability to the structure. Other layers of materials may be employed as part of the packaging material.

8 Claims, No Drawings

BARRIER FILM STRUCTURES USING CARBON MONOXIDE-CONTAINING POLYMERS

CROSS-REFERENCE TO RELATED APPLICATION

This is a divisional of application Ser. No. 738,009 filed May 28, 1985, now U.S. Pat. No. 4,640,865, which application is a continuation-in-part of co-pending application Ser. No. 645,990 filed Aug. 31, 1984, now U.S. Pat. No. 4,601,948 which is, itself, a continuation-in-part of copending Ser. No. 531,110 filed Sept. 12, 1983, now U.S. Pat. No. 4,600,614.

FIELD OF THE INVENTION

Multi-ply packaging materials, having good barrier properties, which are sealable with high-frequency electromagnetic energy.

BACKGROUND OF THE INVENTION

The use of high-frequency electromagnetic energy as a means of heating polymers is an advancing art which finds application in many fields, especially in fields in which conventional conductive, convective, or radiant heat energy is either not suitable, not practical, or not possible. For instance, sealing of a polymer to itself or to some other substrate can be (if the composition of the polymer is appropriate) an important commercial technique in producing a desired end-product.

There are some polymers which are not suitable, or at least not well-suited, for high-frequency heating operations. In such ill-suited polymers high-frequency heating either does not occur, or if it occurs it does so only after inefficiently prolonged periods of treatment time. In production assembly lines, e.g., a quick heat-seal operation is generally preferred over a prolonged heat-seal operation.

Among the polymers which are ill-suited for high-frequency heating are olefin polymers, e.g., polymers and copolymers of ethylene, propylene, styrene or other α-olefinically unsaturated hydrocarbons having about 2 to about 10 carbon atoms. Some of these olefin polymers may contain polar groups, or polarizable groups, due to the incorporation therein of, e.g., acrylic (or methacrylic) acids or their alkyl esters as comonomers with the olefins, and these groups may, at high levels of incorporation tend to impart a modicum of high-frequency heatability to the polymer, but the efficacy is generally so slight that it is infeasible on a commercial basis. Some polymers having polar groups, e.g. chlorinated P.E., ethylene/vinyl acetate copolymer, PVC, polyvinylidene chloride, and polyamide, are heatable under the influence of certain frequencies of electromagnetic radiation, but are not generally well-suited for bonding using the higher frequencies.

Polyethylene is particularly known in the art to be substantially unsuitable for high-frequency heating unless sensitizers are added to the polymer; this is true regardless of whether it is linear or branched, or of whether it is low, medium, or high density (see, e.g., U.S. Pat. Nos. 3,336,173; 3,640,913; and 3,810,799).

It is an object of the present invention to provide ways and means for imparting improved high-frequency heatability to those olefin polymers and copolymers which ordinarily are found to be ill-suited for such heating operations, wherein carbon monoxide-containing olefin polymers are prepared and provided with a barrier film of a polymer having halogen groups pendant from the polymer chain.

SUMMARY OF THE INVENTION

Films, sheets, or slabs of olefin polymers containing carbon monoxide copolymerized therein are coated, on at least a portion thereof, with a film having good barrier properties, such as polyvinyl halide, polyvinylidene halide, and copolymers comprising polyvinyl halide and polyvinylidene halide; the halide is preferably chloride, but may be fluoride, or a mixture of chlorides and fluorides may be used.

DETAILED DESCRIPTIONS

The preparation of olefin polymers, copolymers, and terpolymers is well known and the methods and techniques are well known to practitioners of the relevent polymer art. For the most part, the olefin copolymers and terpolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used by selecting a catalyst (such as in U.S. Pat. No. 3,083,184) which is not easily poisoned or deactivated by carbon monoxide, or other oxygen-containing monomer, which is generally highly reactive with many metal-carbon bonds.

Olefin polymers within the purview of this invention, and which are rendered heatable (by high-frequency electromagnetic radiation) by incorporating carbon monoxide groups into the polymer chain, are polymers formed by polymerizing monomers having ethylenic (olefinic) unsaturation. A sole olefin or a plurality of olefins may be used along with the carbon monoxide in preparing the polymers. Preferably the olefin monomer is ethylene (sometimes including a small proportion of a $C_3$-$C_8$ aliphatic olefin for property modification). The olefin monomer can also include an unsaturated organic acid having 3 to 8 carbon atoms, such as acrylic acid, methacrylic acid, 1-butenoic acid, and the like; alkyl esters or metal salts of these acids may also be used, such as ethyl acrylate, methyl methacrylate, 2-ethyl hexyl acrylate, sodium acrylate, potassium methacrylate, and the like. Hydrogenated CO-containing olefin polymers (which creates H—C—OH groups along the polymer chain) are included here, such as hydrogenated ethylene/carbon monoxide copolymers. U.S. Pat. No. 2,495,292 discloses methods of hydrogenating such CO groups in a polymer chain.

It has been known for many years that olefins, e.g. ethylene, and carbon monoxide, can be copolymerized or terpolymerized.

The following listed patents are believed to be representative of the art pertaining to interpolymers of carbon monoxide and monoolefins: U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; 4,304,887; and Canadian No. 471,169.

It is also known that there are additives (sensitizers) which can be blended into a polymer, e.g. polyethylene, to render it heatable by electromagnetic high-frequency energy, such as talc, ZnCl₂, carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" which can give irregular results and may even damage the polymer.

It is within the purview of one aspect of the present inventive concept to create high-frequency sensitizer groups along the polymer chain in polymers which otherwise would be ill-suited for high-frequency heating. In this invention one does not encounter untoward visual effects in the polymer as a result of the sensitizer. Even in the present embodiments wherein a polymer of the present invention is blended with polymer (e.g., as a "masterbatch") in order to sensitize the whole, the polymers are generally compatible to an extent at which little or no visual effects are encountered. Thus, clear films of olefin polymers can be prepared, in accordance with the present invention, which are readily heat-sealed using high-frequency energy. It is especially of importance that the present invention provides polymers which are heatable by the action of microwave (MW) energy, a particular portion of the high-frequency energy range, thereby helping to fill a need in the industry where there is a sparsity of polymers which are suitable. The amount of CO groups in the ethylene interpolymers should be in the range of about 0.1 to about 50 g by weight, preferably about 1 to about 40% by weight, most preferably about 5 to about 30% by weight.

As used herein "high-frequency sealability" refers to the bonding of the sealable polymer to a portion of itself or to another material using electromagnetic energy frequencies of 0.1-30,000 MHz. This includes radio-frequency (RF) heating and microwave (MW) heating in contradistinction to conventional heat sealing. The high-frequency range is generally taken to include electromagnetic waves over a broad frequency range (0.1 to 30,000 MHz) and covers the radio frequency (RF) range (1 MHz-300 MHz), and the microwave (MW) frequency range (300 MHz-10,000 MHz). The RF and MW ranges are of particular interest here, with special interest in the MW range due to the increasing use of MW as a processing device.

Uses for this technology (polymer or blends) includes packaging applications where high speed and/or non-destructive seals are required, e.g., high-frequency activated adhesive films; extrusion coatings; moldings; hot melts in uses such as aseptic packaging, retort pouches, sandwich bags; lamination of foam, fabric, or film layers; powder moldings, and the like. Furthermore, the present invention provides polymers suitable for use in RF extruders, including continuous extruders or batch extruders. Wire and cable coatings can be applied in a continuous RF-extruder by the present invention.

In one aspect, this invention relates to an improved method of rendering a polymer which is not heatable or sealable utilizing high-frequency (0.1-30,000 MHz) electromagnetic radiation (HF) (e.g., polyethylene, polypropylene, polystyrene, etc.) HF-sealable by either incorporation of carbon monoxide by copolymerization or by blending or grafting a carbon monoxide copolymer or terpolymer into the polymer matrix. Hydrogenated forms of the above can also be used. In addition, ethylene/carbon monoxide copolymer (ECO) and interpolymers containing CO can be used for microwave sealing applications (i.e., microwave sealable plastic bags, toothpaste tube sealing, shampoo tube sealing, other microwave sealable containers, valve bag sealing, etc.). We have unexpectedly found that ECO copolymers and interpolymers convert high-frequency electromagnetic radiation into heat for sealing, welding or fusing over a broad frequency range (0.1-30,000 MHz). Typically, ethylene copolymers may be heatable to some extent at low RF frequencies of 1-50 MHz (radio frequency range is typically considered to be from 1-300 MHz; microwave frequency range is 300-30,000 MHz) such as ethylene/vinyl acetate copolymer (EVA), but none have been found which efficiently heat at the higher frequencies. Other examples of polymers heatable at low frequencies, but which do not efficiently heat at the higher frequencies are polyvinyl chloride (PVC), polyvinylidene chloride, chlorinated polyethylene (CPE), and Nylon 6.

The advantages of sealing polymers with high-frequency electromagnetic waves include faster and more efficient sealing, sealing through poor heat-conductors, e.g., paper or cardboard exteriors, stronger seals or bonds, improved economics based on efficient use of energy input, the ability to seal, bond, or laminate larger surface areas, sealing of thicker or more complex film laminates, specific sealing, and the ability to seal wet surfaces at microwave frequencies where moisture couples with the energy to provide heat for the bonding.

The general heating rate for the interaction of an electromagnetic wave can be used to determine sealing rates utilizing the following equation:

$$G = 13.3 \times 10^{-14} fF^2 (E' \tan \delta) \qquad (1)$$

where G is the heating rate in cal/cm³.sec, f is the frequency in Hz of the electromagnetic wave, $F^2$ is the field strength or power in volts/cm, E' is the dielectric constant of the polymer and tan δ is the dielectric loss tangent (measure of the heating property of the material when exposed to HF electromagnetic waves). Thus, in general (since tan δ varies with frequency) the higher the frequency the higher the heating rate or the faster the sealing ability of the material. The carbon monoxide (CO) containing interpolymers can be sealed or heated over a broad frequency range which allows one to have the option of using microwave frequencies for optimum speed in heating or sealing. This feature (heating or sealing over such a broad frequency) appears to be unique to these interpolymers or copolymers containing CO.

There are also advantages of CO copolymers or interpolymers over other polymers (e.g., PVC, PVDC, CPE, EVA), that are sealable using radio frequency sealing methods which include, for example:

1. ECO is like conventional low density polyethylenes in physical properties and film appearance, i.e., higher melting point, low film blockage, easy processability, can be used for film, extrusion coating and molding resin. Furthermore, the need for plasticizers is obviated.

2. CO can be copolymerized with ethylene and vinyl acetate to produce a CO-modified EVA polymer to render it more sealable and broadens the sealing frequency range. CO can also be copolymerized into an EAA or EMAA polymer allowing an EAA-like or EMAA-like terpolymer to be RF and microwave seal-able (EAA and EMAA are not RF or microwave sealable). This includes the metal salts or "ionomer-type" embodiments of these polymers.

3. CO containing copolymers or interpolymers have higher dielectric constants than EVA copolymers, allowing higher field strengths to be used without the fear of arcing.

EXAMPLE 1

The following Table I shows the time required to melt a polymer in a microwave oven (Sears Microclassic microwave oven) at maximum power (brought 275 ml of water to boil in 2.48 minutes).

TABLE I

| Resin* | MI*** | Melt Time (sec)** |
|---|---|---|
| ECO | | |
| 10% CO | 1 | 37 |
| 10% CO | 10 | 35 |
| 5% AA; 10% CO | 10 | 75 |
| 5% AA; 10% CO | 3.5 | 85 |
| 5% AA; 5% CO | 3 | 90 |
| 1% CO | 1 | 90 |
| EVA (14% VA) | wax | >10 min |
| EAA (12% AA) | wax | >10 min |
| Oxidized (PE) | wax | >10 min |
| E/vinyl alcohol | — | 42 |
| EVA/CO (20% CO) | — | 25 |
| EVA | | |
| 28% VA | 3.5 | >10 min |
| 18% VA | 3.0 | >10 min |
| EAA | | |
| 20% AA | 300 | >10 min |
| 30% AA | 1250 | >10 min |
| HDPE (0.965 dens.) | .8 | >10 min |
| LDPE (0.918 dens.) | 6 | >10 min |
| LLDPE (0.918 dens.) | 6 | >10 min |
| Nylon ®-6 resin (dried) | — | >10 min |
| Saran ® B-200 polymer | — | >10 min |
| Chlorinated P.E. | — | >10 min |

*Samples were 2" discs of 60 mil thickness, positioned on a non-RF sensitive polycarbonate sheet.
**If no melting was evident in 10 minutes, the test was stopped and reported as >10 min.
***MI is melt index in accordance with ASTM D-1238.
®Registered tradenames As can be seen from Table I, only ethylene/vinyl alcohol polymer and ethylene interpolymers containing carbon monoxide melted in the microwave oven (2450 MHz).

EXAMPLE 2

In order to determine the RF-sealability of carbon monoxide containing copolymers, a Callanan 1½ KW high-frequency electronic generator equipped with a 3/32"×12" brass sealing electrode and operating over a frequency range of 20-40 MHz (RF) was utilized in the following sealing experiment. Samples of 3 mil blown film of the copolymers shown in Table II were attempted to be sealed using the above RF sealer utilizing various dwell settings (sealing time) and power settings. The seals were examined and a seal was considered to have been made when the two sheets of material could not be separated at the seal point without tearing either piece of film. Table II also shows the improvement in minimum sealing time and resistance to arcing of CO containing copolymers in comparison to EVA copolymers.

TABLE II
RADIO FREQUENCY SEALABILITY

| Resin | Power Setting | Dwell Time sec. | Sealability |
|---|---|---|---|
| EVA | 90 | 3 | No |
| (9.3% VA, 2 MI) | 100 | 3 | No |
| | 100 | 4 | Arc* |
| EVA | 10 | 1 | No |
| (18% VA, 2.5 MI) | 40 | 2 | No |
| | 70 | 2 | Yes |
| | 60 | 2 | Yes |
| | 70 | 1 | No |
| | 80 | 1 | Yes |
| | 90 | 2 | Arc |
| EVA | 60 | 2 | No |
| (12.0% VA, 2.5 MI) | 70 | 2 | No |
| | 80 | 2 | No |
| | 90 | 2 | Yes |
| | 100 | 1 | Arc |
| EVA | 30 | 2 | Yes |
| (25% VA, 2 MI) | 20 | 2 | No |
| | 60 | 1 | Yes |
| | 60 | .5 | No |
| | 70 | .5 | No |
| | 80 | .5 | Arc |
| EVA | 40 | 2 | Yes |
| (28% VA, 3.0 MI) | 20 | 1 | Yes |
| | 70 | .5 | Yes |
| | 80 | .25 | Arc |
| | 80 | .5 | Arc |
| ECO | 50 | 2 | No |
| (10% CO, 1 MI) | 60 | 2 | No |
| | 70 | 2 | Yes |
| | 100 | 1 | Yes |
| | 90 | 1 | Yes |
| | 80 | 1 | No |
| | 100 | .5 | Yes |
| | 90 | .5 | No |
| E/AA/CO | 70 | 2 | Yes |
| (5% AA, 10% CO, | 60 | 2 | Yes |
| 3.5 MI) | 50 | 2 | Yes |
| | 70 | 1 | Yes |
| | 60 | 1 | Yes |
| | 70 | .5 | Yes |
| | 60 | .5 | No |
| | 80 | .25 | No |
| | 90 | .25 | Yes |
| E/AA/CO | 70 | .5 | Yes |
| (5% AA, 10% CO, | 80 | .5 | Yes |
| 10 MI) | 80 | .25 | No |
| | 90 | .25 | Yes |

*Arc results in a hole burned through the film.

Within the purview of the present invention, useful articles are prepared which utilize the high-frequency electromagnetic radiation heatability and sealability of the above described CO containing olefin polymers. Layers or plies of these polymers are used as a means for sealing or bonding materials which are not, themselves, efficiently suitable for high-frequency electromagnetic radiation sealing or bonding. Various substrates, including particles, films, sheets, blocks, rods, spheres, and the like can be coated, at least in the area desired to be bonded, with these subject polymers and then sealed or bonded together using high-frequency electromagnetic radiation, especially those frequencies in the microwave range. These polymers, in the form of powders or particles, may be extruded into useful shapes, or as coatings onto other materials (e.g. wire and cable coatings), using high-frequency electromagnetic radiation as the heating means.

Novel adhesives comprising terpolymers of ethylene/carbon monoxide/carboxylic acid are prepared as embodiments in accordance with the present invention. The carboxylic acid moiety of the terpolymer may be any of the unsaturated carboxylic acid which are polymerizable through the double-bond, such as acrylic acid, methacrylic acid, crotonic acid, 1-butenoic acid, and the like, especially acrylic acid or methacrylic acid, most especially acrylic acid, including salts of these acids, such as metal salts, especially Na or K salts, commonly known as "ionomer" salts. The preparation of these E/CO/acid terpolymers may be done in the same manner as the E/acid copolymers as disclosed in U.S. Pat. Nos. 3,520,861 and 4,351,931. These patents disclose the use of a high pressure stirred autoclave reactor, using a free-radical initiator, to prepare uniform, random ethylene/carboxylic acid copolymers. Whereas these terpolymers can also be made by grafting techniques, by block polymerization techniques, in batch reactors, or in long tube reactors, it is preferred that the above disclosed stirred autoclave reactors be used whereby substantially uniform, random terpolymers are made.

Even though E/AA copolymers are generally regarded as having good adhesive properties with many substrates, as compared to polyethylene, there are some substrates where improved adhesion is desirable. Notable among these substrates, where improved adhesion is desirable, are polyamides (e.g. nylons), polyolefins (e.g. LDPE, HDPE, LLDPE, PP, OPP, polyisoprene), fluoropolymers (e.g. PTFE), polyethylene terephthalate (PET), metals (e.g. steel and aluminum foil), some paper-type products (e.g. glassine, kraft paper, etc.), cured epoxy resins, ethylene/vinyl alcohol copolymers, cured novolac resins, polyurethanes, polycarbonates, chloropolymers (e.g. polychloroprene, PVC, polyvinylidene), and inorganic substrates (e.g. glass and porcelain).

Conversely, whereas ECO copolymers exhibit a modicum of heat-activated or heat-induced adhesive properties to some substrates, it has been determined that the present E/CO/acid terpolymers exhibit greater adhesiveness in such instances, especially to such substrates as SARAN polymer and polycarbonate (where ECO has some adhesiveness) and to ethylene/vinyl alcohol copolymers, nylon, and aluminum (where ECO exhibits little or no adhesiveness).

The adhesive properties of these E/CO/acid terpolymers may be utilized by any convenient method, such as by hot-melt application, by post-heating of the adhesive in-situ on the substrate, by application of the adhesive in a carrier, such as in a solvent or as a dispersion in an aqueous carrier or in a non-solvent. The adhesive may be used in joining substrates of similar or dissimilar materials. As mentioned hereinbefore, these terpolymers are also suitable for use as films or as other materials and have the beneficial property of being high-frequency heatable, especially at those frequencies which are in, or near, the microwave range.

These E/CO/acid terpolymers are quite similar in optics and physical properties to EAA copolymers made by the same process. Insofar as these novel adhesive terpolymers are concerned, the ranges of the comonomer ingredients are as follows:

| Monomer | Weight % of Terpolymer | | |
|---|---|---|---|
| | Operable | Preferred | Most Preferred |
| Ethylene | 20–98 | 40–98 | 60–96 |
| Carbon Monoxide | 1–40 | 1–30 | 2–20 |
| Carboxylic Acid | 1–40 | 1–30 | 2–20 |

The melt index (M.I.), also called melt flow rate, as measured in accordance with ASTM D-1238, is preferably in the range of about 0.5 to about 2500, most preferably in the range of about 1 to about 60, even more preferably in the range of about 1 to about 20.

These E/CO/acid terpolymers are thermoplastic and can be thermoformed into films, sheets, tubes, or other articles. Powders of these terpolymers can be compression molded into sintered forms or the powders can be applied to the surface of a substrate where it can be heat-plastified to provide an adhesive layer or coating on the substrate or between two substrates. A film, strip, or sheet of these terpolymers can be placed between two substrates and heat-plastified to serve as an adhesive or laminate layer to hold the substrates together.

The following examples illustrate certain embodiments of the E/CO/acid terpolymers, compared with other polymers, but the invention is not limited to the specific embodiments shown.

EXAMPLE 3

The examples shown in Table III below are produced by compression molding at pressures and temperatures conducive to heat fusion. The resin samples to be tested for adhesion are first compression molded into 20 mil plaques and then laminated to the substrate (a film or plaque) to test for adhesion to the substrate. The adhesion of ethylene/carbon monoxide/acrylic acid terpolymers, E/CO/AA, is shown in comparision to low density polyethylene, LDPE; ethylene/acrylic acid copolymer; E/AA; ethylene/vinylacetate copolymer, E/VA; ethylene/carbon monoxide copolymer, E/CO; and ethylene/carbon monoxide/vinyl acetate terpolymer, E/CO/VA. The good adhesiveness obtainable with E/CO/AA terpolymers to the various substrates is evident, especially with nylon (a polyamide) and with polycarbonate which generally do not form strong bonds with most heat-plastified adhesives.

TABLE III

| | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| ADHESIVE | AA | CO | VA | MI | A[1] | B[2] | Nylon[3] | Aluminum[4] | EVAL[5] | Polycarbonate[6] |
| LDPE | — | — | — | — | .01 | .01 | .01 | .05 | .01 | .01 |
| E/AA Copolymer | 6.2 | — | — | 3.02 | .01 | .02 | 2.4 | 18.1 | .50 | .05 |
| E/AA Copolymer | 9.8 | — | — | 9.6 | .01 | .01 | 3.8 | 29.2 | .70 | .08 |
| E/AA Copolymer | 9.0 | — | — | 3.6 | .01 | .01 | 4.2 | 27.4 | .50 | .08 |
| E/VA Copolymer | — | — | 28.5 | 5.8 | 7.5 | 6.3 | 5.4 | 2.1 | 3.1 | .08 |
| E/VA Copolymer | — | — | 6.5 | 1.11 | .04 | .10 | 6.44 | 8.9 | 6.8 | .05 |
| E/CO/AA Terpolymer | 5.0 | 5.0 | — | 56.1 | J10.47 | J2.39 | 1.83 | 18.0 | 3.1 | 7.5 |
| E/CO/AA Terpolymer | 5.0 | 10.0 | — | 4.3 | 11.8 | J1.89 | 9.88 | 16.0 | 7.5 | J10.4 |
| E/CO/AA Terpolymer | 5.0 | 10.0 | — | 18.7 | 9.0 | J4.2 | J23.2 | 22.5 | 7.9 | J10.4 |
| E/CO Copolymer | 0 | 10.0 | — | 7 | 9.6 | J2.4 | .5 | .4 | .2 | J 7.8 |

TABLE III-continued

| ADHESIVE | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| | AA | CO | VA | MI | A[1] | B[2] | Nylon[3] | Aluminum[4] | EVAL[5] | Polycarbonate[6] |
| E/CO Copolymer | 0 | 10.0 | — | 8.2 | 10.3 | J4.1 | .1 | .8 | .5 | J 8.2 |
| E/CO/AA Terpolymer | 10.0 | 5.0 | — | 4.1 | 7.1 | 1.5 | J24.2 | 24.9 | 6.9 | DNR |
| E/CO/VA Terpolymer | — | 10.0 | 10.0 | 35.2 | 8.2 | 6.1 | 8.8 | 2.0 | 1.33 | DNR |

J indicates cohesive failure strength of film substrate
[1] 6-mil SARAN PVDC film
[2] 2-mil SARAN PVDC film
[3] Nylon-6 film
[4] Aluminum
[5] ethylene/vinyl alcohol copolymer, molded 20-mil plaque
[6] 2-mil polycarbonate cast film

EXAMPLE 4

In order to compare an ethylene/carbon monoxide copolymer (10% CO by weight, 18.7 M.I.) with an ethylene/carbon monoxide/acrylic acid terpolymer (10% CO and 5% AA by weight, 12.8 M.I.), a 2-mil thick coating of each is extrusion-coated onto various substrates and adhesion (lb./in.) is measured. In Table IV below, Sample A is the E/CO copolymer and is extrusion-coated at about 300° C.; Sample B is the E/CO/AA terpolymer and is extrusion-coated at about 290° C.; PVDC means polyvinylidene chloride; EVAL means ethylene/vinyl alcohol copolymer; LLDPE means linear low density polyethylene; LDPE means low density polyethylene; PET means polyethylene terephthalate; OPP means oriented polypropylene.

TABLE IV

| SAMPLE | PVDC | PET | POLYAMIDE | OPP | ALUMINUM | LDPE | LLDPE |
|---|---|---|---|---|---|---|---|
| A | >5* | 0.5 | 0.32 | <0.05 | 0.14 | 0.3 | 0.07 |
| B | >5* | 1.6 | 2.44 | 0.05 | 2.5 | 0.5 | 0.5 |

*All > samples resulted in film failure, not adhesive failure. The above illustrates the superior adhesiveness of E/CO/AA terpolymers as compared to E/CO copolymers.

EXAMPLE 5

The packaging industry utilizes a number of barrier resins, such as in Table V below, and the E/CO/acid terpolymers are found to make good adhesives for making laminates which contain one or more barrier layers.

TABLE V

| | Oxygen Barrier Resistance |
|---|---|
| Nominal Value* | Polymer |
| 0.03–0.30 | ethylene/vinyl alcohol copolymers; EVAL |
| 0.05–0.20 | polymers or copolymers based in vinyl chloride and/or vinylidene chloride monomers; SARAN polymers |
| 2 | polyvinyl chloride, PVC |
| 80 | plasticized PVC |
| 4 | PET, polyethylene terephthalate |
| 10 | nylon, polyamide |
| 125 | HDPE, high density polyethylene |

*cm$^3$ of O$_2$ as measured by ASTM D-1434.

EXAMPLE 6

It has been determined that E/CO/acid terpolymers are useful as heat-plastified adhesives between layers of similar plastics or resins, layers of dissimilar plastics or resins, and/or between layers of plastics or resins and completely different substrates, such as paper, cloth, metal, glass, vitreous material, wood, leather. These terpolymers are also useful as heat-plastified adhesives between layers of materials, neither layer being plastic or resin, such as the materials named immediately above.

Particularly useful embodiments are those wherein a CO-containing polymer, especially an E/CO, E/CO/VA, E/CO/MAA, or E/CO/AA polymer is employed as an RF-sealable layer laminated, or otherwise adhered, to a barrier film of a halo-polymer such as polyvinyl halide, polyvinylidene halide, copolymers of polyvinyl halide and polyvinylidene halide, halogenated polyolefins, halogenated polyethylene, and the like, where the halogen groups are preferably chlorine or fluorine or a mixture of chlorine and fluorine; most preferably the halogen is chlorine. Layers of other materials may be used as parts of a multi-layered structure which include the halo-polymer barrier layer on a CO-containing polymer, especially an E/CO, E/CO/VA, E/CO/MAA, or E/CO/AA polymer RF-sealable layer, including those where the E/CO, E/CO/VA, E/CO/MAA, or E/CO/AA polymer is co-extruded with other polymers. The halo-polymer may be extruded onto the E/CO, E/CO/VA, E/CO/MAA, or E/CO/AA polymer layer, or may be co-extruded with the E/CO, E/CC/VA, E/CO/MAA, or E/CO/AA polymer or may be applied as a fine-particle aqueous disperion, such as a latex, or as a solution, thereby forming a thin film on the E/CO, E/CO/VA, E/CO/MAA, or E/CO/AA. The barrier properties of greatest concern for many packaging films are those wherein O$_2$ and H$_2$O are substantially prevented from passing through the packaging film by the use of a barrier layer in, or on, the packaging film.

The halopolymers may also contain other copolymerized monomer moieties, such as acrylate, methacrylate, acrylonitrile, and the like, such as: poly (vinylidene chloride)/vinyl chloride; poly(vinylidene chloride)/acrylonitrile; poly(vinylidene chloride)/acrylate; poly(vinylidene chloride)/alkyl methacrylate; poly (vinylidene chloride)/methyl methacrylate; and terpolymers of these.

Latexes (aqueous fine dispersions) of polyvinylidene chloride and/or polyvinyl chloride which are suitable for coating of the E/CO, E/CO/VA, E/CO/MAA, and E/CO/AA polymers have solids contents generally in the range of 10–90 wt. %, preferably about 30 to about 75 wt. % and generally contain surfactants, stabilizers, and/or surface tension modifiers, and generally have surface tensions in the range of about 30 to 90 dynes/cm, preferably about 40 to 80 dynes/cm when measured at 23° C.

Latexes available commercially as SARAN* latexes (*a tradename of The Dow Chemical Company) may be used, such as, SL112, SL116, SL118, SL143, and SL159, all of which are latexes comprising vinylidene chloride polymers which are commercially available.

Adhesion of the halo-polymer to the E/CO, E/CO/VA, E/CO/MAA, and E/CO/AA films, when applied as a latex (fine-particle aqueous dispersion), is appreciably improved by first treating the CO-containing film surface with a corona discharge. This corona treatment "cleans" the film surface, increases the polarity of the surface, and modifies the surface tension of the film surface. Corona treatment is provided by using a commercially available apparatus, Model RS-96 Surface Treater from ENI Power Systems Inc. Treating levels of about 0.1 to about 20 watts/ft.$^2$/min.(215 watts/m$^2$/min.), preferably about 2-10 watts/ft.$^2$/min.(21.5 watts/m$^2$/min. to about 107 watts/m$^2$/min.) may be used. Above about 20 watts/ft.$^2$/min.(215 watts/m$^2$/min.), one may encounter excessive polymer degradation.

The latex may be applied to the film by spraying, brushing, or spreading, using a doctor blade or other device, if needed, to attain the desired thickness, allowing for evaporation of the aqueous carrier. One type of spreader which functions as a "doctor blade" which has been commonly used for many years in the art of laying down coatings on a substrate, is a Mayer* rod (*a tradename) which is a round rod wrapped with wire; these come in different sizes commensurate with the desired thickness of the fluid latex to be applied. One may use a direct gravier, a flexographic, offset gravier, or trailing blade coater to apply the latex. The latex is then dried, especially at about 20°-150° C. and can be heated using RF-heating frequencies.

Among the many possible laminates which comprise or contain a CO-containing polymer with a coating of halo-polymer on it, a few particular ones are illustrated, below:

| halo-polymer | halo-polymer | halo-polymer | halo-polymer |
|---|---|---|---|
| CO—polymer | CO—polymer | CO—polymer | CO—polymer |
|  | adhesive | adhesive | print |
|  | barrier layer | barrier layer | halo-polymer |
|  | adhesive | adhesive |  |
| halo-polymer | polyolefin | paper |  |
| CO—polymer |  | polyolefin | halo-polymer |
| adhesive |  | print | CO—polymer |
| polystyrene | halo-polymer | polyolefin | polycarbonate |
|  | CO—polymer |  |  |
|  | substrate |  |  |

In the above-illustrated layered structures the meaning of the terms used in describing the layers are:

halo-polymer—a thermoplastic organic polymer which contains sufficient halogen groups to provide barrier properties to substantially inhibit or prevent the passage of $O_2$ or $H_2O$; preferably these are polymers principally based on vinyl halide or vinylidene halide, where the halide is chloride or fluoride, or a mixture, most preferably chloride;

CO-polymer—a thermoplastic organic polymer having carbon monoxide units along the polymer chain, preferably E/CO, E/CO/VA, E/CO/MAA, or E/CO/AA, most preferably E/CO or E/CO/AA;

adhesive—a thermoplastic (such as an acrylic or vinyl polymer) or a thermosetting polymer or resin (such as a urethane or epoxy) which may be used in providing adhesion of one layer to another, if needed;

barrier layer—this may be a halo-polymer as described above, or may be another material which has desired barrier properties, such as polyvinylalcohol, metal foil, nylon, polytetrafluoroethylene, polyethylene/vinyl alcohol copolymer, acrylonitrile polymers and copolymers, and the like;

paper—this may be Kraft paper or other pressed fibrous material such as those prepared in a Fourdrinier process;

print—this may be any printed matter, such as words, numbers, logos, designs, etc. which may the printed on at least one ply of a laminate;

substrate—this may be a layer of natural material, such as cloth, cellulosicbased, wood, metal, ceramic, or refractory material, or may be a synthetic material such as thermoplastic or thermosetting materials or polymeric condensates, including sintered, woven, non-woven, cast, or fused materials; this includes, inter alia, HDPE,LLDPE, LDPE, polypropylene, other polyolefins, polyacrylates, vinyl polymers, and the like.

Thin layers of halo-polymers are likely to emit heat about as fast as it is generated by RF-energy, thus thin layers are not efficiently brought to a heat-plastified condition well enough to obtain a good seal, even though thin layers of the halopolymers provide good barrier properties for the heat-sealable CO-containing polymer

EXAMPLE 7

A 2-mil (0.05 mm) film of ECO polymer (containing 10% CO, 2 M.I.) was produced using a Sterling* blown film unit (*a tradename) having an 8-inch (20.32 cm) die with a 3.5 inch (8.89 cm) extruder, L/D=30/1, operated at 425° F. (~226.6° C.). The film was corona treated at a treatment level of 5 watts/ft$^2$ (53.7 watts/m$^2$/minute). The surface tension of the film before the corona treatment was 34 dynes/cm and immediately after treatment was 72 dynes/cm as measured by the liquid droplet method. Portions of the treated film were coated at room temperature with the following SARAN* latexes (* a tradename) and tested for adhesion.

| Latex | Coating Quality[1] | Adhesion[2] |
|---|---|---|
| SL 112 | Good | Excellent |
| SL 116 | Excellent | Excellent |
| SL 118 | Excellent | Excellent |
| SL 143 | Excellent | Excellent |
| SL 159 | Excellent | Excellent |

[1]Quality refers to uniformity and continuity of the coating as visually observed.
[2]Adhesion was measured by sticking Scotch Tape 610* adhesive tape (a tradename) to the surface, then removing the tape; if the tape comes off without destroying the coating, then adhesion is excellent.

As a control, a portion of the same ECO film, not corona treated, described above could not be effectively coated with the latexes to achieve a substantial amount of adhesion.

A film of LLDPE fabricated on the same blown film line and corona treated at the same level could not be effectively coated with the latexes to achieve a substantial amount of adhesion.

A film of EAA (ethylene/acrylic acid) copolymer (g% AA, 9 M.I.) was similarly fabricated and corona treated. This film was not effectively coated with the latexes to achieve a substantial amount of adhesion.

EXAMPLE 8

Portions of the ECO film of Example 7 above were corona treated at levels indicated below and the surface tension and coating quality were determined using SL112 and SL159.

| Treatment Level* | | Surface** Tension | Coating Quality | |
|---|---|---|---|---|
| (W/ft$^2$/min) | W/m$^2$/min. | (dynes/cm) | SL112 | SL159 |
| 0 | 0 | 34 | Poor | Poor |
| 2 | 21.5 | 50 | Excellent | Excellent |
| 5 | 53.8 | 52 | Excellent | Excellent |

*W = watts
**measured several days after corona treatment, when effect of surface treatment had faded somewhat.

EXAMPLE 9

A 5-mil (0.125 mm) film of ECO was produced as in Example 7 above and was corona treated at levels indicated below. The surface tension and coating quality were determined using SL112 and SL159.

| Treatment Level* | | Surface** Tension | Quality | |
|---|---|---|---|---|
| (W/ft$^2$/min) | W/m$^2$/min. | (dynes/cm) | SL112 | SL159 |
| 0 | 0 | 34 | Poor | Poor |
| 2 | 21.5 | 46 | Good | DNT$^1$ |
| 8 | 86.0 | 53 | Excellent | Excellent |

$^1$DNT = did not test.

EXAMPLE 10

An ethylene/vinyl acetate, EVA, 2-mil film (10% VA, 6 M.I.) was treated with 5 watts/ft$^2$/min. (53.8 watts/m$^2$/min.) corona treatment level. The film had poor coating quality and had virtually no adhesion to SL112.

Within the ambit of the present invention are novel heat-sealed articles which serve as packaging material or coverings wherein barrier properties are provided by the halopolymer and heat-sealability is provided by the CO-containing polymer. In some packagings or coverings the heat may be applied from the exterior in those instances wherein heat-transfer to the bonding area is not impeded by the thickness or nature of the material, but heating may be more efficiently generated from within the multi-ply material by the effects of high-frequency electromagnetic radiation, such as microwave energy, acting on the CO-containing polymer.

We claim:

1. A method for coating a microwave radiation heatable carbon monoxide-containing ethylene polymer with a halopolymer, said method consisting essentially of corona-treating at least a portion of at least one surface of the carbon monoxide-containing polymer, using a treating level of about 0.1 to about 20 watts/ft.$^2$/minute, applying to the corone-treated surface a fine particle aqueous dispersion or latex of a halopolymer, and drying the halopolymer to form a barrier layer on the microwave heatable carbon monoxide-containing ethylene polymer, thereby producing a halopolymer-coated ethylene polymer which is heatable by the action of microwave radiation acting on the carbon monoxide-containing ethylene polymer, wherein said carbon monoxide-containing ethylene polymer comprises at least one copolymer selected from the group consisting of ethylene/carbon monoxide, ethylene/carbon monoxide/vinyl acetate, ethylene/carbon monoxide/methacrylic acids, and ethylene/carbon monoxide/acrylic acid.

2. The method of claim 1 wherein the halopolyrer comprises at least one selected from the group comprising polyvinylhalide, polyvinylidene halide, poly(vinylidene halide)(vinyl halide), halogenated polyolefins, and halogenated polyethylene.

3. The method of claim 1 wherein the halopolymer comprises a chloropolymer, a fluoropolymer, or a chlorofluoropolymer.

4. The method of claim 1 wherein the carbon monoxide comprises about 1 to about 50% by weight of the carbon monoxide-containing polymer.

5. The method of claim 1 wherein the carbon monoxide comprises about 1 to about 40% by weight of the carbon monoxide-containing polymer.

6. The method of claim 1 wherein the carbon monoxide comprises about 5 to about 30% by weight of the carbon monoxide-containing polymer.

7. The method of claim 1 wherein the carbon monoxide-containing polymer is one which has at least some portion of at least one of its surfaces adhered to another material or substrate, which is not corona treated.

8. The method of claim 1 wherein the corona-treating is performed at a treating level of about 2 to about 10 watts/ft.$^2$/minute.

* * * * *

UNITED STATES PATENT AND TRADEMARK OFFICE
CERTIFICATE OF CORRECTION

PATENT NO. : 4,762,731
DATED : August 9, 1988
INVENTOR(S) : Gerald M. Lancaster, et al.

It is certified that error appears in the above-identified patent and that said Letters Patent is hereby corrected as shown below:

Col. 3, line 25, "pertion" should be --portion--.

Col. 3, line 30, "50 g" should be --50%--.

Col. 5, line 48, "car.bon" should be --carbon--.

Col. 10, line 46, "E/CC/VA," should be --E/CO/VA,--.

Col. 12, line 15, delete the word "the" and insert -- be --.

Col. 12, line 33, insert a --.-- after the word "polymer".

Col. 13, line 2, "(g%" should be --(9%--.

Col. 13, line 28 in the Table, "Quality" should read --Coating Quality--.

Col. 14, line 12, "corone-treated" should be --corona-treated--.

Col. 14, line 26, "halopolyrer" should be --halopolymer--.

Signed and Sealed this

Fourteenth Day of March, 1989

*Attest:*

DONALD J. QUIGG

*Attesting Officer*   Commissioner of Patents and Trademarks